US007342197B2

(12) United States Patent
Hanus et al.

(10) Patent No.: US 7,342,197 B2
(45) Date of Patent: Mar. 11, 2008

(54) PLASMA TORCH WITH CORROSIVE PROTECTED COLLIMATOR

(75) Inventors: Gary J. Hanus, Edina, MN (US); Rodney E. Reeve, Minneapolis, MN (US); Todd J. Stahl, Golden Valley, MN (US)

(73) Assignee: Phoenix Solutions Co., Crystal, MN (US)

(*) Notice: Subject to any disclaimer, the term of this patent is extended or adjusted under 35 U.S.C. 154(b) by 0 days.

(21) Appl. No.: 11/240,050

(22) Filed: Sep. 30, 2005

(65) Prior Publication Data

US 2007/0084834 A1 Apr. 19, 2007

(51) Int. Cl.
*B23K 10/00* (2006.01)

(52) U.S. Cl. ............................ 219/121.5; 219/121.59; 219/121.52; 219/75

(58) Field of Classification Search ............ 219/121.5, 219/121.51, 121.52, 121.48, 74, 75, 121.47, 219/76.16, 121.39, 121.45, 121.59
See application file for complete search history.

(56) References Cited

U.S. PATENT DOCUMENTS 4,510,171 A * 4/1985 Siebert ....................... 427/455
4,766,349 A * 8/1988 Johansson et al. .......... 313/631
4,912,296 A 3/1990 Schlienger
5,014,768 A * 5/1991 Waters et al. ............... 164/418
5,200,595 A 4/1993 Boulos et al.
5,239,162 A 8/1993 Haun et al.
5,308,949 A 5/1994 Reed, Jr.
5,362,939 A 11/1994 Hanus et al.
5,451,740 A 9/1995 Hanus et al.
5,628,924 A * 5/1997 Yoshimitsu et al. ..... 219/121.5
6,452,129 B1 9/2002 Zhu et al.
6,532,768 B1 3/2003 Labrot et al.
6,693,253 B2 2/2004 Boulos et al.
6,744,006 B2 6/2004 Johnson et al.
6,919,527 B2 7/2005 Boulos et al.
6,963,045 B2 * 11/2005 Zapletal et al. ........ 219/121.48
2003/0097903 A1 5/2003 Deegan et al.
2005/0067387 A1 3/2005 Cook et al.

* cited by examiner

*Primary Examiner*—Mark Paschall
(74) *Attorney, Agent, or Firm*—Nikolai & Mersereau, P.A.; Thomas J. Nikolai

(57) ABSTRACT

To protect the collimator of a transferred plasma arc torch from premature failure due to corrosion, an anti-corrosive covering is applied on the exposed face surface and a portion of the inner exit bore of the collimator. The specification describes several methods for producing the collimator for a plasma torch having an anti-corrosive coating or cladding on the exposed surfaces thereof, including electroplating, electroless plating, flame spraying, plasma spraying, plasma transferred arc, hot isostatic pressing and explosive cladding.

23 Claims, 11 Drawing Sheets

PLASMA TORCH WITH CORROSIVE PROTECTED COLLIMATOR

BACKGROUND OF THE INVENTION

I. Field of the Invention

This invention relates generally to the field of plasma arc torches, and more particularly to methods and apparatus for treating the collimator employed in the plasma arc torch to reduce the effects of corrosion and thereby extend the service life of the collimator.

II. Discussion of the Prior Art

Plasma arc torches, as known in the prior art, are capable of efficiently converting electrical energy to heat energy producing extremely high temperatures. For example, a plasma arc torch may typically operate in a range as high as from 6000° C. to 7000° C.

Plasma arc torches are known which use water-cooled, reverse polarity, hollow copper electrodes. A gas, such as argon, nitrogen, helium, hydrogen, air, methane or oxygen, is injected through the hollow electrode, ionized and rendered plasma by an electric arc and injected into or integrated with a heating chamber or process.

As is explained in the Hanus, et al. U.S. Pat. No. 5,362,939, plasma arc torches can be made to operate in either of two modes. In a first mode, termed "transferred arc", a water-cooled rear electrode (anode) applies a high voltage and current to the gas injected into the torch. The material to be heat-treated is made the opposite polarity electrode. As such, the plasma gas passes through a gas vortex generator contained within the torch and out through the central bore of a conductive copper collimator and is made to impinge onto the material serving as the cathode electrode. In the non-transfer arc mode, the arc emanates first from the anode within the torch and reattaches to the cathode at the outlet of the torch. In jumping from the first electrode to the second electrode, the arc extends out beyond the tip of the torch and can be made to impinge upon a workpiece that does not form part of the electrical circuit. Thus, in the non-transferred arc mode, the torch can be used to effectively heat/melt/volatilize non-conductive workpiece materials.

In the case of transfer arc mode torches, the collimator generally comprises a copper holder that screws into the working end of a generally cylindrical torch body in which is contained a rear anode electrode that is electrically-isolated from the collimator. The cylindrical body further contains flow passages for receiving cooling water, routing it through the collimator, and then back through the body of the torch to an outlet port. Likewise, the torch gas has its own passageway to a vortex generator disposed adjacent the central bore of the collimator.

Those readers interested in details of construction of a typical plasma torch are referred to the Hanus, et al. U.S. Pat. No. 5,362,939, the teachings of which are hereby incorporated by reference as if fully set forth herein.

In certain applications of plasma torch technology, the collimator portion of the torch is exposed to corrosive materials. For example, when used in solid waste disposal furnaces to solidify bottom ash and fly ash mixtures into a glass-like mass, chlorine gas is produced from the thermal destruction of plastics. The chlorine can combine with hydrogen to form hydrochloric acid, which can rather rapidly corrode copper surfaces exposed to the acid. It is imperative that the collimator not be corroded to the point where a cooling water channel within the collimator assembly is breached. A stream of water impinging on superheated surfaces in the furnace can be a serious safety problem and must be avoided. This necessitates frequent shut-down and replacement of the collimators before corrosion reaches the point where the leaking can occur.

The collimator used in transferred arc plasma torches may also experience secondary arcing. In such an arrangement, the collimator is floating in potential and, if the voltage gradient between it and the local plasma potential becomes great enough, a branch of the plasma arc may strike the collimator, pitting and eroding its surface.

It is accordingly a principal object of the present invention to provide a corrosion-resistant barrier on exposed surfaces of the collimator used on plasma torches.

It is a further object of the invention to provide a corrosion barrier that is less subject to cracking due to thermal stresses and/or secondary arcing.

SUMMARY OF THE INVENTION

The present invention provides an improved plasma arc torch having a collimating nozzle at its distal where the exposed face surface and substantial portion of the inner exit bore of the collimating nozzle includes an anti-corrosive covering thereon.

In accordance with a first embodiment of the invention, the anti-corrosive covering comprises a relatively thin electroless nickel coating, an alumina coating or a nickel chromium coating. In accordance with an alternative embodiment, the exposed face surface and substantial portion of the inner exit bore of the collimating nozzle is clad to a predetermined thickness with a suitable anti-corrosive alloy applied in a number of different ways, including a plasma transferred arc welding process, a flame spray process, a plasma spray process, an explosion bonding process, a hot isostatic pressing (HIP) and laser cladding process.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
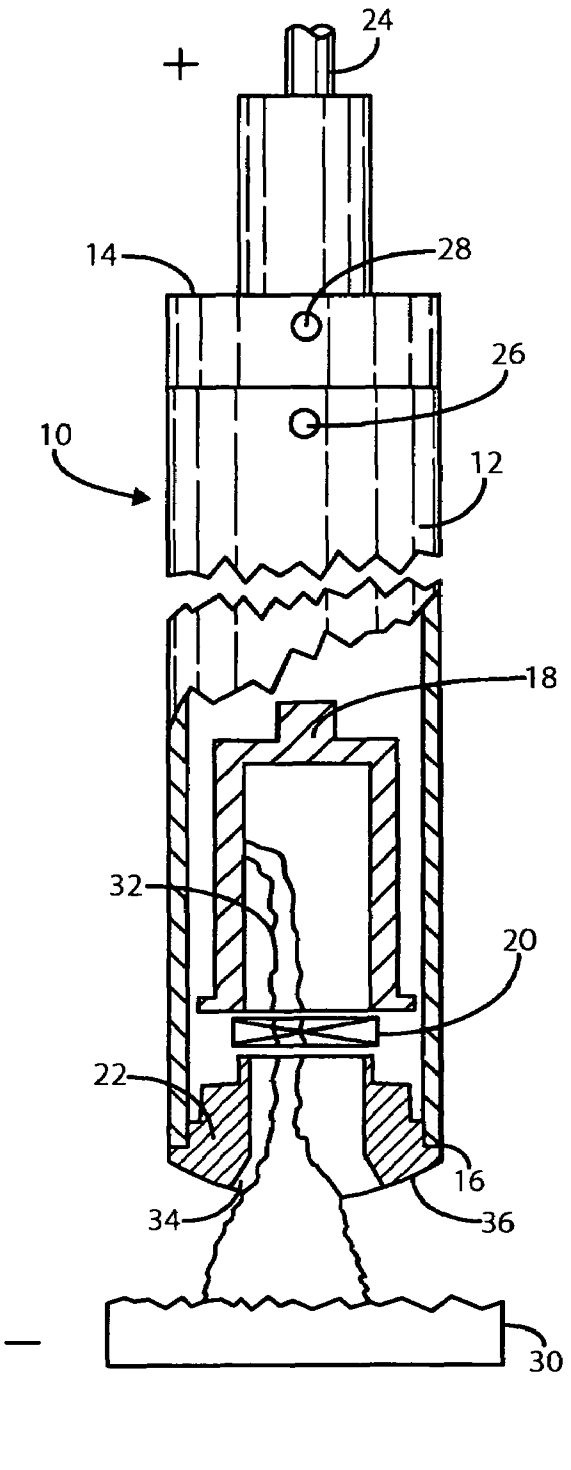
FIG. 1 (PRIOR ART)
FIG. 1 is a partially sectioned view from a transferred arc plasma torch showing a collimator at the distal end thereof.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

Referring first to FIG. 1, there is shown a conventional, prior art plasma torch. It is indicated generally by numeral 10. It is seen to include an outer steel shroud 12 having a proximal end 14 and a distal end 16. The shroud surrounds various internal components of the torch, including a rear electrode 18, a gas vortex generator 20, as well as other tubular structures creating cooling water passages leading to a collimator member 22 that is threadedly attached into the distal end 16 of the shroud 12. Tubing (not shown) connects to a water inlet stub 24, and after traversing the water passages in the torch body and the collimator, the heated water exits the torch at a port 26. Details of the water circulation path for a plasma torch are more clearly set out and explained in the aforementioned Hanus, et al. U.S. Pat. No. 5,362,939 and, hence, need not be repeated here. The gas for the plasma arc torch is applied under pressure to an inlet port 28 and it passes through an annular channel isolated from the incoming and outgoing water channels, ultimately reaching the gas vortex generator 20. A high positive voltage is also applied to the water inlet stub 24 and the negative terminal of the power supply connects to the work piece 30.

The gas injected into port 28 becomes ionized and is rendered plasma by the arc 32 and is injected onto the work piece 30. The collimator 22 includes a longitudinal bore 34 having a frustoconical taper 34 and serves to concentrate the plasma into a beam, focusing intense heat that speeds up melting and chemical reaction in a furnace in which the plasma torch is installed.

The exposed toroidal face 36 of the collimator 22 is exposed to corrosive chemicals given off from the melting/gasification of the work material 30, resulting in erosion and pitting of the collimator. Also, the collimator is subject to secondary arcs, especially in the tapered zone 34 of the collimator.

It is imperative that the collimator not be allowed to deteriorate to the point where cooling water can escape the normal channels provided in the torch and flow out onto the work piece that may be at a temperature of 2000° F. or more. Resulting superheated steam can create an explosive force within the confines of a plasma arc heated furnace. To avoid such an event, it becomes necessary to shut down the process and replace the collimator at relatively frequent intervals. The purpose of the present invention is to prolong the useful life of the collimator, thereby reducing the downtime of the process in which the plasma arc torch is used.

Figure 2:
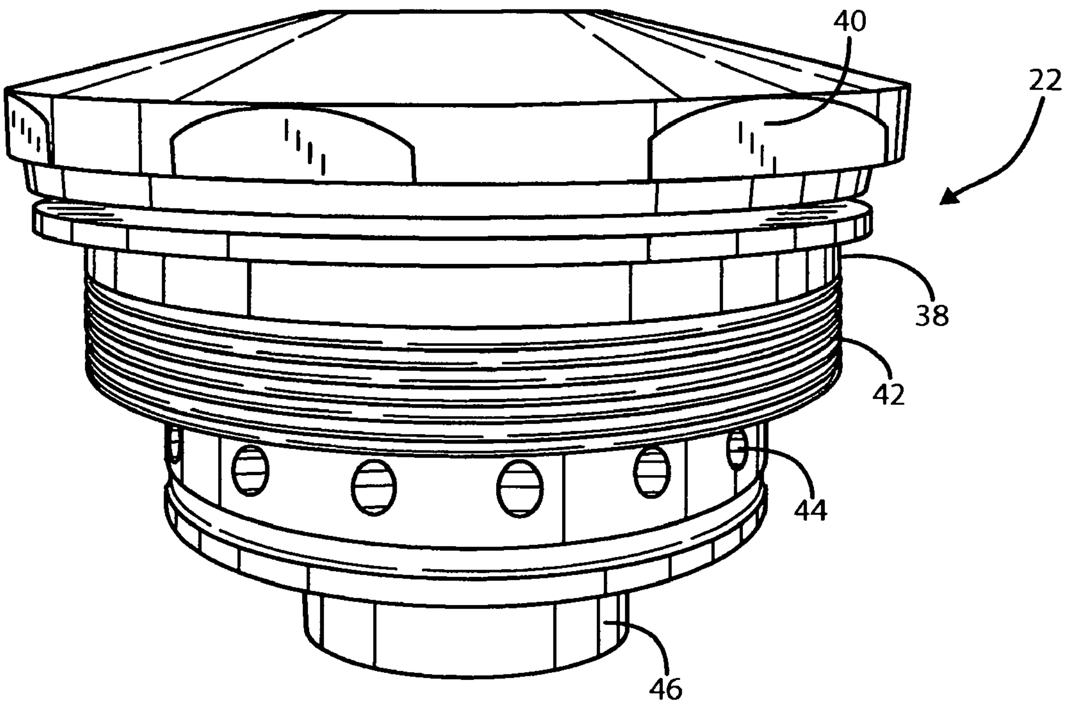
FIG. 2 (PRIOR ART)
FIG. 2 is a perspective view of the collimator removed from the plasma torch.

Referring next to FIG. 2, there is shown a perspective view from the side of a prior art collimator 22 of FIG. 1. It is seen to comprise a holder member 38 having a generally cylindrical outer wall that is machined along a top edge portion with flat surfaces, as at 40, forming a hexagonal pattern that allows the holder member to be grasped by a wrench and screwed into a threaded distal end of the torch body 12. The threads on the holder member are identified by numeral 42 in FIG. 2. The holder member 38 is preferably machined out from a generally cylindrical copper billet, copper being a good electrical and thermal conductor.

Located directly below the threaded zone 42 on the holder member is a plurality of bores, as at 44, that is regularly spaced circumferentially about the periphery of the holder member. An integrally formed annular collar 46 is provided at the proximal end of the collimator.

Figure 3:
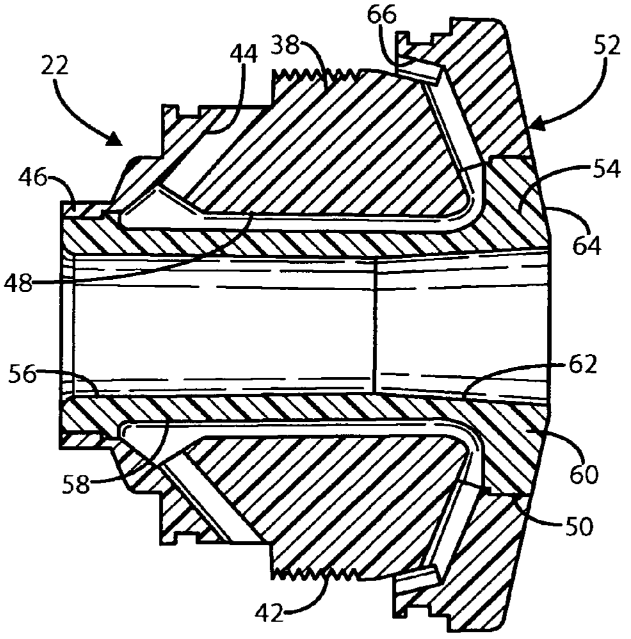
FIG. 3 (PRIOR ART)
FIG. 3 is a cross-sectional view of one design of a plasma arc torch collimator.

FIG. 3 is a longitudinal, cross-sectional view taken through the center of the collimator assembly. Here it can be seen that the holder member 38 has a central longitudinal bore 48 and a counterbore 50 that is formed inwardly from a face surface 52 of the holder member. Further, it can be seen that the radial bores 44 are in fluid communication with the central bore 48.

The collimator assembly 22 further includes a tubular insert 54 machined from a copper billet and having a central lumen 56 and an outer wall 58 whose diameter is dimensioned to fit within the central bore 48 of the holder member with a predetermined clearance space between the wall defining the central bore of the holder member and the outer diameter of the tubular insert. The insert is also formed with a circular flange 60 at its distal end and that surrounds the lumen 56. Further, the cross-sectional view of FIG. 3 reveals that the lumen 56 has a frusto-conical tapered portion 62 leading to a face surface 64 of the flange 60.

In the prior art collimator assembly shown in FIG. 3, with the tubular insert 54 disposed within the bore 48 of the holder member and with the flange 60 inserted into the counterbore 50, the joint between the periphery of the flange 60 and the wall of the counterbore 50 is suitably electron beam (e-beam) welded. Likewise, the joint between the collar 46 of the holder member and a portion of the exterior wall of the tubular insert are designed to fit together with a close tolerance and this joint is also e-beam welded.

As is explained in the Hanus, et al. '939 patent, supra, cooling water is made to flow through a first annular passageway, through the radial bores 44 and through the clearance space between the bore 48 and the outer tubular wall 58 of the insert 54 and from there, out through an annular port to another passageway contained within the shroud 12 and leading to the water outlet port 26 (FIG. 1).

In that the tubular insert 54 is also preferably formed from copper, it is subject to corrosion due to exposure to chemical substances produced during thermal destruction of target materials being heated/melted in a plasma torch heated furnace. The face surfaces 52 and 64 of the holder member and the insert, respectively, will lose material due to corrosion and erosion due to secondary arc strikes. The e-beam weld in the joint between the flange 60 and the counterbore 50 is also particularly vulnerable and should a leak occur in this joint, cooling water under high pressure may leak from the aforementioned cooling water passages in the collimator as a jet-like stream only to impinge on the work piece 30, which may be at a temperature in excess of 3000° F.

Figure 4:
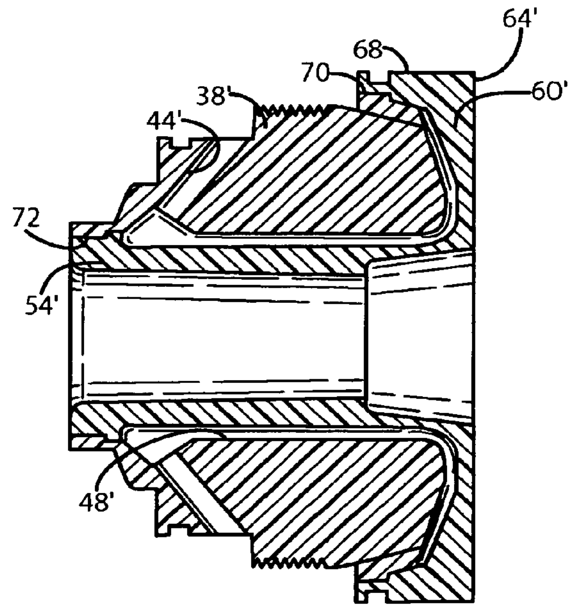
FIG. 4 is a cross-sectional view of an alternative collimator design.

FIG. 4 illustrates an alternative design of a collimator that eliminates the welded joint on the collimator's face. This is achieved by reconfiguring the holder member 38' so that it no longer includes an exposed face, as at 52 in FIG. 3, nor a counterbore 50 as in the embodiment of FIG. 3. Instead, the insert member 54' includes a substantially wider flange 60' and whose peripheral edge is offset in a rearward direction from the face surface 64'. The offset portion is identified by numeral 68. Following insertion of the insert member through the bore 48' of the holder member, the two are welded together at locations 70 and 72, respectively. Once the collimator assembly is screwed into the distal end of the torch body 12, neither the weld joint 70 nor the weld joint 72 is exposed to corrosive byproducts generated during the high temperature processing of waste materials.

The present invention provides methods for prolonging the life of the collimator used in plasma arc torch constructions. Specifically, by providing an anti-corrosive covering on the exposed face surface and substantial portion of the inner exit bores of the holder member and the insert, the useful life of the collimator can be extended.

In accordance with a first method for reducing the effects of corrosion on the life of the collimator, the exposed face surfaces 64 and 52 of the design of FIG. 3 and 64' in the design of FIG. 4 has a relatively thin, corrosive-resistant coating applied thereto. For example, and without limitation, a first layer of nickel may be electroplated onto the aforementioned face surfaces to a thickness of about 0.001 in., followed by the electro-plating of chromium to a thickness of 0.002 in. Alternatively, electroless nickel can be deposited on the aforementioned face surfaces to a thickness in the range of from about 0.002 in. to 0.003 in. In yet another arrangement, after applying a bond coating of nickel to the exposed copper surfaces of the collimator, aluminum oxide (alumina) may be applied in a flame spraying process as an over-coat to a thickness of about 0.010 in.

The aforementioned plating/thin coating operations have proven effective in extending the time-to-replacement by a factor of three. Coating failure ultimately tended to occur at the location of any sharp edges, especially where the tapered bore 62 intersects with the somewhat planar forceps of the insert's flange.

In an attempt to gain even further improvement, various changes were made to the collimator geometry itself prior to the plating/coating operations. More particularly, sharp edges at the intersection of the tapered portion of the insert's lumen with the exposed face surface were smoothly radiused, as were the peripheral edges. This reduces cracking of the coating and exposure of the underlying copper. Generally speaking, the thin plating of anti-corrosion coatings and sprayed on anti-corrosive coatings proved effective until cracks or deep craters due to secondary arcing developed that exposed the underlying copper. The smoother edges proximate the tapered portion of the inserts lumen, plus the plated and/or plasma-sprayed collimators resulted in a 20 times useful life extension over the prior art bare copper collimators. The coatings remained effective until deep craters due to secondary arcing ultimately ate through the coating layers to expose the underlying copper.

Still further improvement in the useful life of collimators used in plasma arc torches has been achieved by covering the exposed face surface and substantial portion of the inner exit bore of the copper collimating nozzle with a cladding layer of a predetermined thickness. Cladding materials that have proven successful include Hastelloy (C-22), Iconel-617, and Inconel-625 materials.

Figure 7:
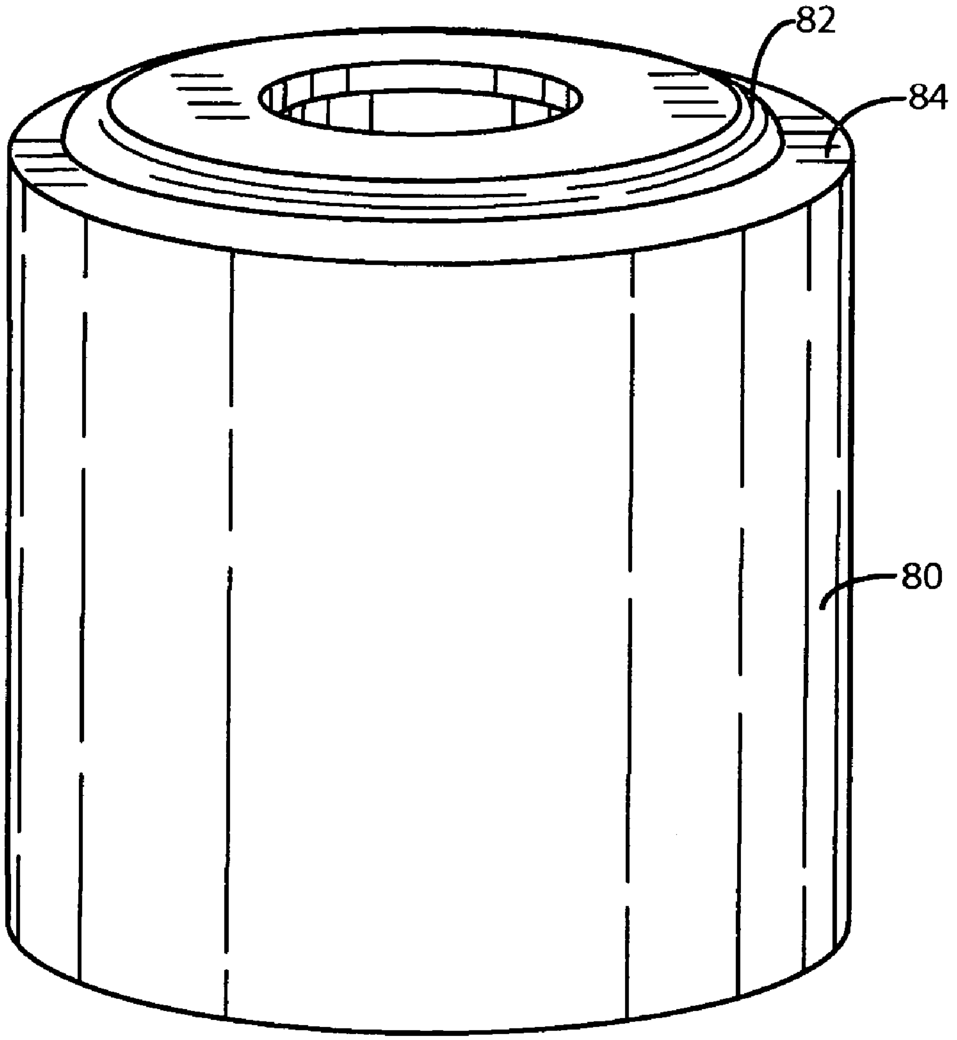
FIG. 7 is a perspective view of a raw copper billet with a cladding layer from which either the collimator holder member or the collimator insert is machined.
Figure 8:
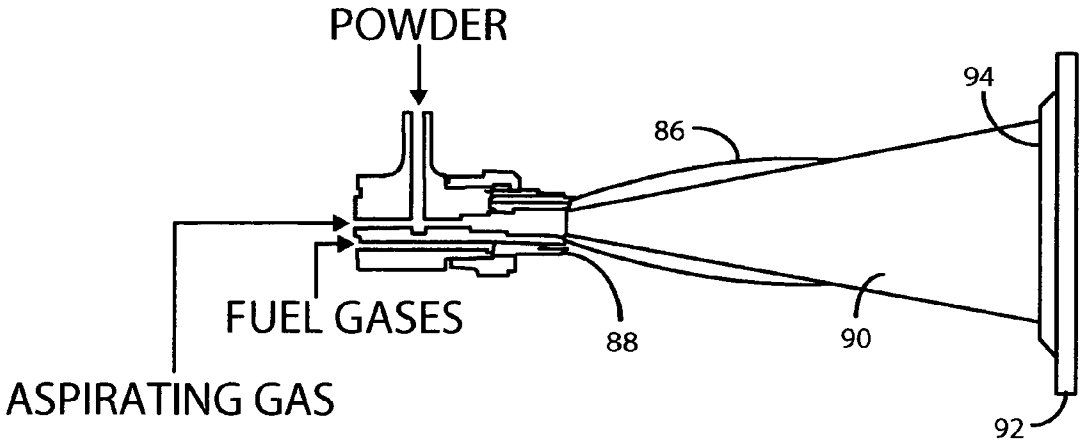
FIG. 8 is an illustration schematically showing a flame spraying process.

Referring to FIG. 7, the manner in which the holder member and insert of a collimator may be formed with a protective, anti-corrosive cladding layer applied will now be explained. Starting with a cylindrical solid copper billet 80, a layer of cladding material 82 is applied to the upper base surface 84 of the billet to a desired thickness, typically 1 to 10 mm. A variety of cladding methods known in the art can be utilized in bonding the anticorrosive alloy to the copper billet. For example, in a flame spraying process, an apparatus like that illustrated in FIG. 8 may be used. Here, a consumable (usually a metallic powder or a wire) is heated above the melting point and propelled onto the surface of the billet to form a coating. Flame spraying typically uses the heat from the combustion of a fuel gas, such as acetylene or propane, with oxygen to melt the coating material, which can be fed into the spraying gun as a powder. As shown in FIG. 8, the powder is fed directly into the flame by a stream of compressed air or inert gas, i.e., the aspirating gas. Alternatively, in some basic systems, the powder is drawn into the flame using a venturi effect, which is sustained by the fuel gas flow. It is important that the powder be heated sufficiently as it passes through the flame. The carrier gas feeds the metallic powder into the center of an annular combustion flame 86 where it is heated. A second outer annular gas nozzle 88 feeds a stream of compressed air around the combustion flame, which accelerates the spray particles in the spray stream 90 toward the substrate 92 and focuses the flame.

Two key areas that affect coating quality are surface preparation and spraying parameters. Surface preparation is important for adhesion of the coating 94 and can affect the corrosion performance of the coating. The main factors are grit-blast profile and surface contamination. Spraying parameters are more likely to affect the coating microstructure and will also influence coating performance. Important parameters include gun-to-substrate orientation and distance, gas flow rates and powder feed rates.

The bond of a thermally sprayed coating is mainly mechanical. However, this does not allow the bond strength to remain independent of the substrate material. All thermal spray coating maintains a degree of internal stress. This stress gets larger as the coating gets thicker. Therefore, there is a limit to how thick a coating can be applied. In some cases, a thinner coating will have higher bond strength.

Figure 9:
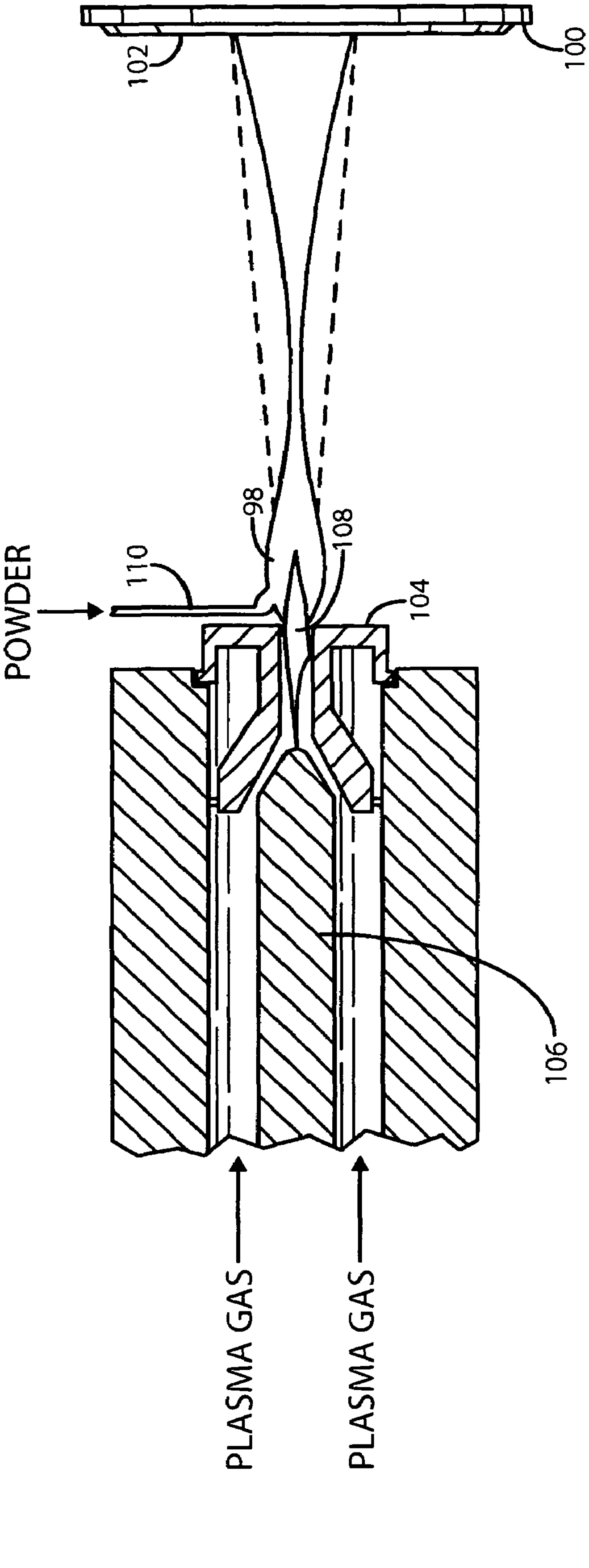
FIG. 9 is an illustration schematically showing a plasma spray process.

Turning next to FIG. 9, another process that can advantageously be used to apply a cladding layer of an anticorrosive material to a copper substrate comprises the plasma spray process. Like the flame spray process, it basically involves the spraying of molten or heat softened material onto a surface to provide a coating. Material in the form of a powder is injected into a very high temperature plasma flame 98, where it is rapidly heated and accelerated to a high velocity. The hot material impacts on the substrate surface 100 and rapidly cools, forming a coating 102. This plasma spray process, carried out correctly is called a "cold process", as the substrate temperature can be kept low during processing, avoiding damage, metallurgical change and distortion to the substrate material. As shown in FIG. 9, the plasma spray gun comprises a copper anode 104 and a tungsten cathode 106, both of which are water-cooled. Plasma gas (argon, nitrogen, hydrogen, helium) flows around the cathode 106 and through the anode 104, which is shaped as a constricting nozzle. The plasma is initiated by a high voltage discharge, which causes localized ionization and a conductive path for a DC arc to form between the cathode and the anode. The resistance heating from the arc causes the gas to reach extreme temperatures, dissociates and ionized to form a plasma. The plasma exits the anode nozzle as a free or neutral plasma flame, i.e., a plasma which does not carry electric current, which is quite different when compared to the plasma transferred arc coating process where the arc extends to the surface to be coated. When the plasma is stabilized and ready for spraying, the electric arc extends down the anode nozzle 108, instead of shorting out to the nearest edge of the anode nozzle. This stretching of the arc is due to a thermal pinch effect. Cold gas around the surface of the water-cooled anode nozzle being electrically non-conductive constricts the plasma arc, raising its temperature and velocity. Powder is fed into the plasma flame most commonly by way of an external powder port 110 mounted near the anode nozzle exit. The powder is so rapidly accelerated that spray distances can be in the order of 25 to 150 mm.

Plasma spraying has the advantage in that it can spray very high melting point materials, such as refractory materials, including ceramics, unlike combustion processes. Plasma-sprayed coatings are generally much denser, stronger and cleaner than other thermal spray processes.

Figure 10:
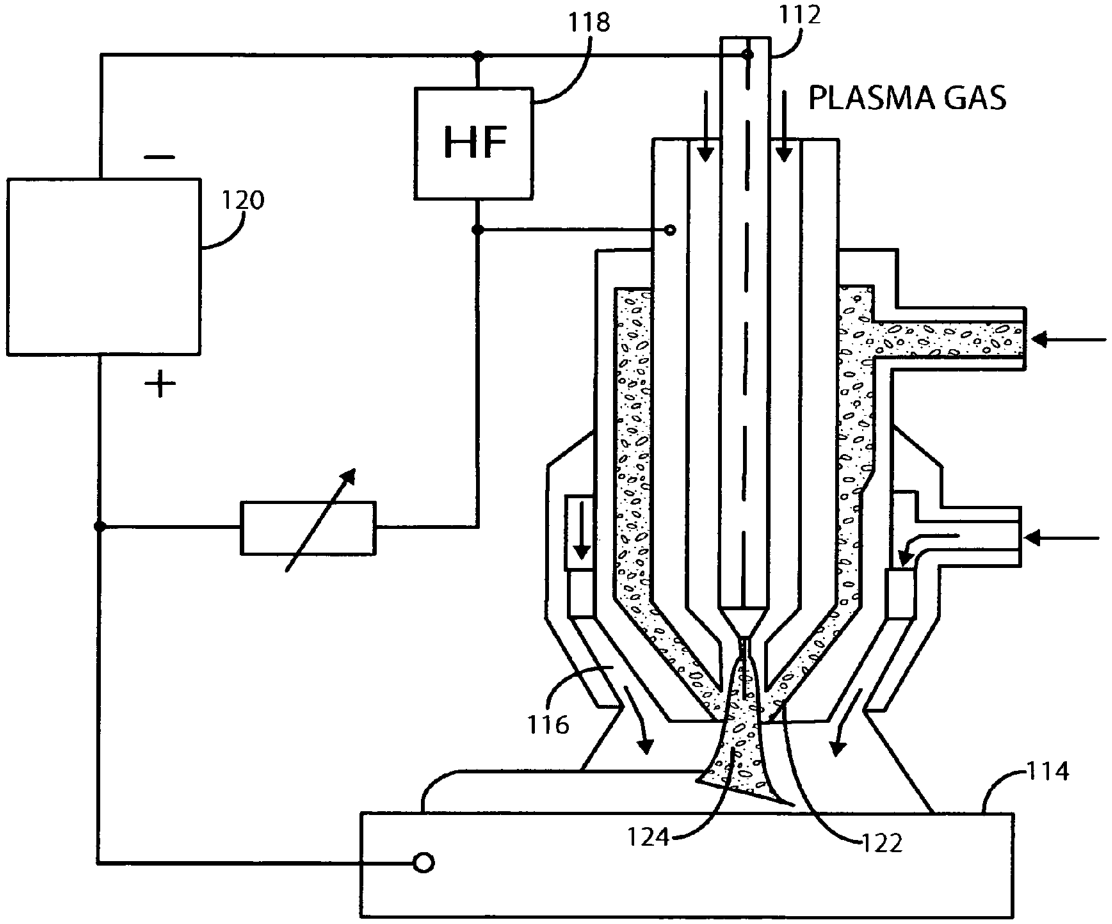
FIG. 10 is an illustration showing a plasma transferred arc cladding process.

FIG. 10 schematically illustrates an apparatus for plasma-transferred arc cladding. Here, the pilot arc is ignited or generated between a non-consumable tungsten electrode 112 and a work piece 114. A plasma forming nozzle 116 and the high voltage from an oscillator unit 118 with the help of high voltage from a power supply 120. The pilot arc, in turn, creates the transferred arc between the tungsten electrode 112 and the work piece 114. The transferred arc is constricted by the plasma forming nozzle 122, getting higher temperatures and concentration. The additive powder is fed into the arc column 124 by a carrier gas.

It is possible to regulate process conditions so that the whole amount of powder and only a thin film on the workpiece are melted. As a result, a metallurgical bond between the cladding layer and the billet is provided with the minimum dilution of the detailed materials. Argon is basically used for arc plasma supply, powder transport and molten material shielding. Plasma transferred arc cladding affords high deposition rates up to 10 kilograms per hour. Deposits between 0.5 and 5 mm in thickness and 3 to 5 mm in diameter can be produced rapidly.

Figure 11:
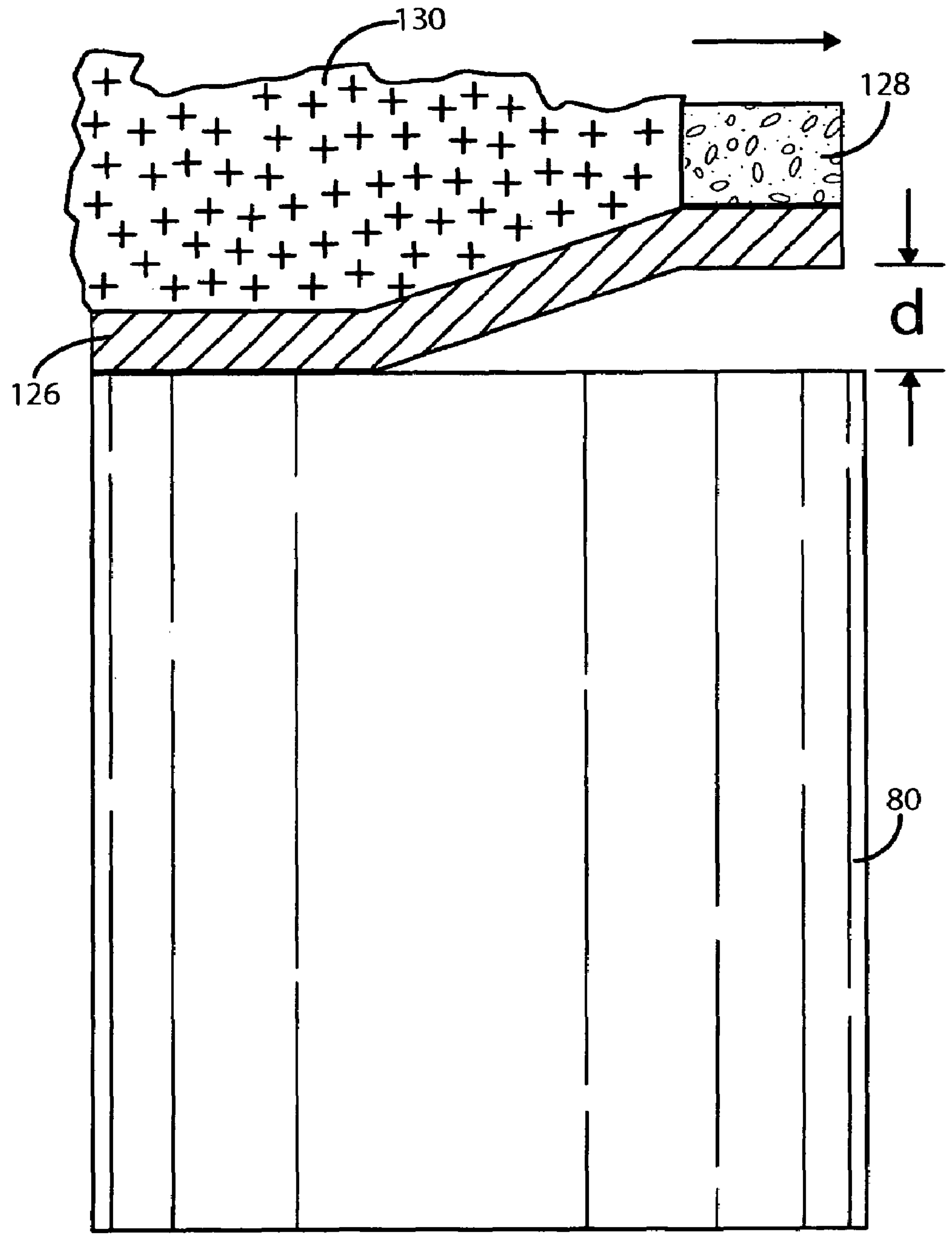
FIG. 11 is an illustration schematically showing an explosion bonding processing for applying a cladding layer to a copper billet.

Still another method for cladding the billet is illustrated in FIG. 11. Here, so-called explosion cladding is illustrated. The explosion bonding process, also known as "cladding by the explosion welding process", is a technically based industrial welding process known in the art. As in any other welding process, it complies with well-understood, reliable principles. The process uses an explosive detonation as the energy source to produce a metallurgical bond between metal components. It can used to join virtually any metals combination, both those that are metallurgically compatible and those that are known as non-weldable by conventional processes. Furthermore, an explosion bonding process can clad one or more layers onto one or both faces of a base material with the potential for each to be a different metal type or alloy.

Due to its use of explosive energy, the process occurs extremely fast; unlike conventional welding processes, parameters cannot be fine-tuned during the bonding operation. The bonded product quality is assured through collection of proper process parameters, which can be well controlled. These include metal surface preparation, plate separation distance prior to bonding, an explosive load, velocity and detonation energy. Selection of parameters is based upon the mechanical properties, mass, an acoustic velocity of each component metal being bonded. Optimal bonding parameters, which result in consistent product quality, have been established for most metals combinations. Parameters for other systems can be determined by calculation using established formulas.

The first step in explosion cladding is to prepare the two surfaces that are to be bonded together. The cladding layer comprises a plate 126 of a selected, anti-corrosive alloy. Its surfaces are ground or polished to achieve a uniform surface finish. The cladding plate 126 is positioned and fixtured so as to be positioned parallel to and above the surface of the copper billet 80 to be clad. The distance, d, between the cladding plate and the billet surface is referred to as "the standoff distance", which must be predetermined for the specific metal combinations being bonded. The distance is selected to assure that the cladding plate collides with the billet after accelerating to a specific collision velocity. The standoff distance typically varies from 0.5 to four times the thickness of the cladding plate, dependent upon the choice of impact parameters as described below. The limited tolerance in collision velocity results in a similar tolerance control of the standoff distance.

An explosive containment frame (not shown) is placed around the edges of the cladding metal plate. The height of the frame is set to contain a specific amount of explosive 128, providing a specific energy release per unit area. The explosive, which is generally granular or uniformly distributed on the cladding plate surface, fills the containment frame. It is ignited at a predetermined point on the plate surface using a high velocity explosive booster. The detonation travels away from the initiation point and across the plate surface at the specific detonation rate. The gas expansion of the explosive detonation 130 accelerates the cladding plate across the standoff gap, resulting in an angular collision at the specific collision velocity. The resultant impact creates very high-localized pressures at the collision point. These pressures travel away from the collision point at the acoustic velocity of the metals. Since the collision is moving forward at a subsonic rate, pressures are created at the immediately approaching adjacent surfaces, which are sufficient to spall a thin layer of metal from each surface and eject it away in a jet. The surface contaminants, oxides and impurities are stripped away in the jet. At the collision point, the newly created clean metal surfaces impact at a high pressure of several hundred atmospheres. Although there is much heat generated in the explosive detonation, there is no time for heat transfer to the metals. The result is an ideal metal-to-metal bond without melting or diffusion.

Figure 5A:
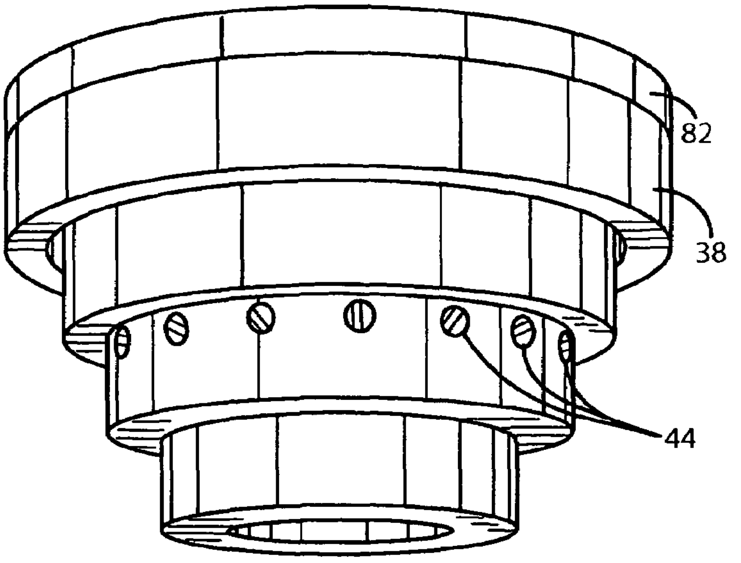
FIG. 5*a* is a perspective view from the side of the collimator holder used in the design of FIG. 3 and with a cladding layer of a corrosion resistant alloy on an exposed face thereof.
Figure 5B:
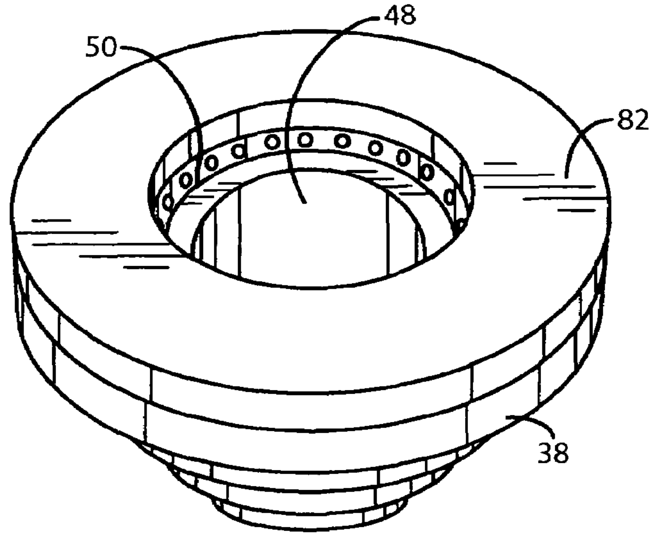
FIG. 5*b* is a perspective view from the top of the collimator holder of FIG. 5*a*.
Figure 6:
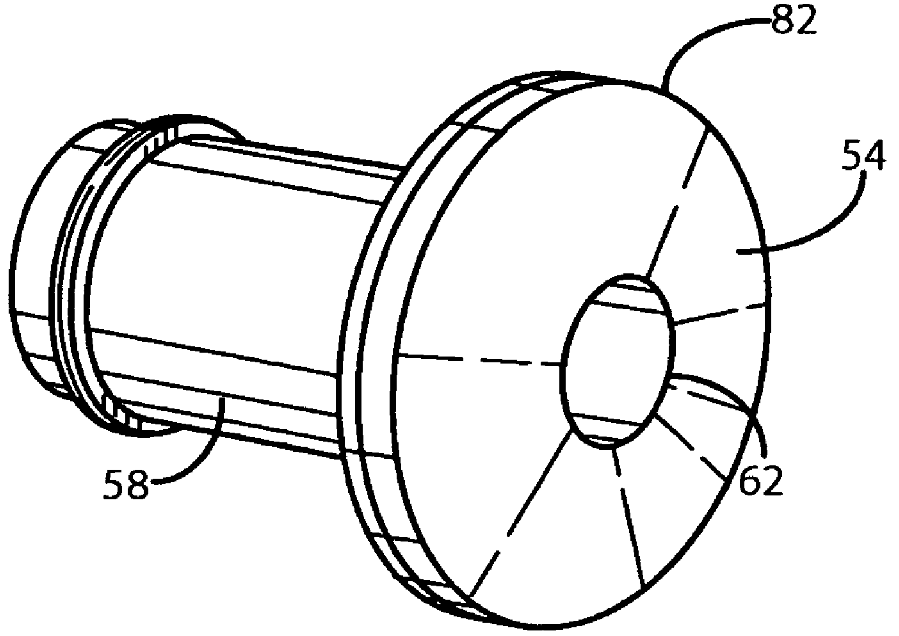
FIG. 6 is a perspective view of a collimator insert used in the design of FIG. 3 and having a cladding layer covering the exposed face surface thereof.

FIGS. 5*a* and 5*b* illustrate the holder member after the billet 80 and its cladding layer 82 have been machined. Likewise, FIG. 6 illustrates the tubular insert 54 of FIG. 3 after the billet with its cladding layer has been machined. It is to be noted that the cladding layer comprises a significant portion of the tapered portion of the lumen of the insert member. This is advantageous in that it provides increased thickness of cladding material in a zone that is particularly vulnerable to corrosive deterioration.

Once the insert is placed into the holder member, electron beam welding may be used to form a continuous weld along a joint between the periphery of the flange on the insert and the wall in the holder member defining the counterbore. Although plating showed about a three times improvement in collimator life compared to an untreated copper collimator, with cladding, the improvement was about ten times.

Figure 12A:
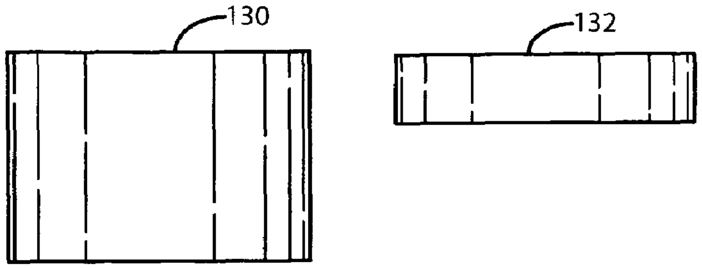
FIGS. 12A-12D illustrates schematically the sequence in carrying out the HIP process for cladding.
Figure 12B:
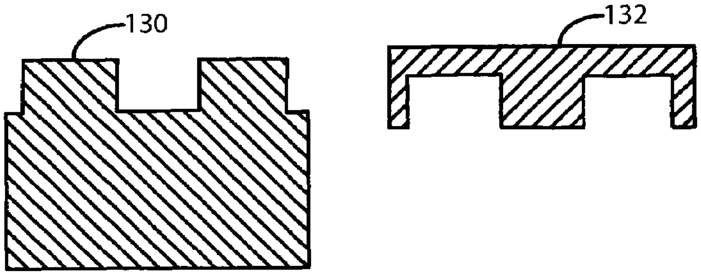
Figure 12C:
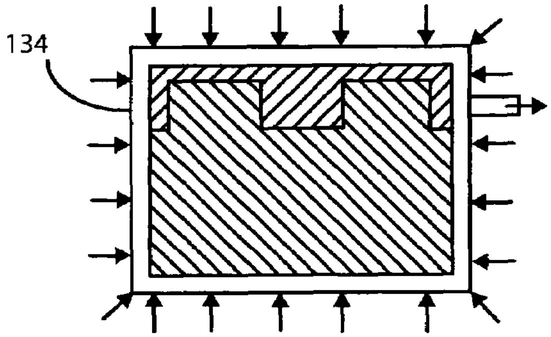
Figure 12D:
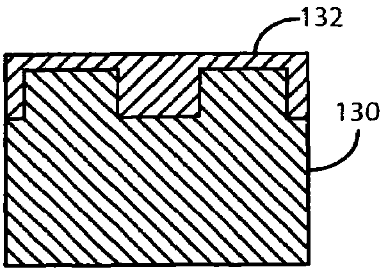

As illustrated schematically in FIG. 12A, a cylindrical copper alloy billet 130 is first machined, as shown in FIG. 12B, to yield a desired top profile. Likewise, a cylindrical disk 132 of an anti-corrosive alloy is machined so as to have a complimentary profile to the top portion of the billet 130. It is also an option to stamp a disk of the anti-corrosive alloy to exhibit the complimentary profile. The disk 132 is placed atop the machined surface of the billet 130 and the two are placed within a sealed container (FIG. 12C) where the assembly may be subjected to elevated temperatures and a very high vacuum to remove air and moisture. The container is then subjected to a high pressure and elevated temperature in a solid-to-solid HIP process resulting in a firm bond between the billet 130 and the anti-corrosive layer 132 as shown in FIG. 12D.

Rather than starting with a solid disk 132 of anti-corrosive alloy, the copper billet 132 may also be clad in a HIP process by first machining the billet 130 as shown in FIG. 12A and then adding the anti-corrosive alloy as a powder. More particularly, during the cladding process, a powder mixture of one or more selected elements is placed atop the copper alloy billet in the container 134, typically a steel can. The container is subjected to elevated temperature and a very high vacuum to remove air and moisture from the powder. The container is then sealed and an inert gas under high pressure and elevated temperatures is applied, resulting in the removal of internal voids and creating a strong metallurgical bond throughout the material. The result is a clean, homogeneous layer of an anti-corrosive metal with a uniformly fine grain size and a near 100% density adhered to the copper billet. However formed, the clad billet is then subjected to the machining operations necessary to create the collimator holder and/or the collimator insert, all as previously described.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. In a plasma arc torch of the type having a tubular rear housing section with a cylindrical rear electrode mounted coaxially within the tubular rear housing, said cylindrical rear electrode having a closed inner and an open outer end, an annular vortex generator member disposed adjacent the outer end of the rear electrode and a front electrode adjacent a collimating nozzle with an exposed face surface and an inner exit bore therethrough, the collimating nozzle releasably coupled to the tubular rear housing in coaxial alignment with said rear electrode and the vortex generator member, the improvement comprising:

(a) an anti-corrosive cladding layer on the exposed face surface of the collimating nozzle, the cladding layer being a metal alloy of a predetermined thickness sufficient to preclude penetration by a secondary arcing at torch operating power levels in excess of 500 KW.

2. The plasma arc torch as in claim 1 and further including an anti-corrosive metal alloy cladding layer on a portion of the inner exit bore of the collimating nozzle.

3. The plasma arc torch as in claim 1 wherein one of the front electrode and collimating nozzle is a copper alloy.

4. The plasma arc torch as in claim 1 wherein the cladding layer is an anti-corrosive alloy applied in one of a flame spray, a plasma spray and a hot isostatic press process.

5. The plasma arc torch as in claim 4 wherein the anti-corrosive alloy comprises one of a nickel-based alloy and a chromium-based alloy.

6. The plasma arc torch as in claim 2 wherein the cladding layer is applied in one of a plasma transferred arc process, an explosion cladding process, a hot isostatic press process and a laser cladding process.

7. The plasma arc torch as in claim 6 wherein the cladding layer comprises corrosion-resistant alloys selected from a group consisting of nickel and chrome alloys.

8. The plasma arc torch as in claim 2 wherein the collimating nozzle comprises:

(a) a holder having a generally cylindrical wall and a central longitudinal bore extending therethrough with a counter-bore formed inwardly from one end thereof and a plurality of radial bores extending through the wall in fluid communication with the central bore;

(b) a tubular insert having a lumen and dimensioned to fit within said central bore with a predetermined clearance space between the central bore and an outer diameter of the insert, the tubular insert including a circular flange at a distal end thereof surrounding said lumen; and (c) a weld joining a peripheral surface of the circular flange to the holder in the counter-bore such that a face of the circular flange and an exposed surface of the holder together define said exposed face surface and said portion of the inner exit bore of the collimating nozzle.

9. The plasma arc torch as in claim 8 wherein the holder and insert each comprise a copper alloy.

10. The plasma arc torch as in claim 9 wherein the anti-corrosive metal alloy cladding layer on the exposed face surface and said portion of the inner exit bore of the copper collimating nozzle is applied in one of a plasma transferred arc welding process, an explosion bonding process, a hot isostatic pressing process and a laser welding process.

11. The plasma arc torch as in claim 6 wherein the cladding layer comprises one of a nickel alloy and chromium alloy.

12. A method of manufacturing a collimating nozzle for a plasma arc torch, comprising the steps of:

(a) machining a holder member from a cylindrical block of copper where the holder member includes a cylindrical outer wall and a longitudinal bore extending therethrough with a counter-bore formed inwardly from one end thereof, and a plurality of radial bores extending through the wall in fluid communication with the central bore;

(b) machining a tubular insert member from a block of copper, the tubular insert member having a lumen and dimensioned to fit within said longitudinal bore of the holder member with a predetermined clearance space between the longitudinal bore and an outer diameter of the insert member, the tubular insert member further comprising a circular flange at one end thereof surrounding the lumen;

(c) inserting the tubular insert member into the longitudinal bore of the holder member with the circular flange disposed in said counterbore;

(d) creating a continuous weld between a periphery of the flange and a wall defining the counterbore; and (e) cladding a predetermined exposed surface of the assembly of step (d) and at least a portion of a wall defining the lumen of the insert member with an anti-corrosive alloy layer having a predetermined thickness sufficient to preclude penetration by secondary arcing at torch operating power levels in excess of 500 KW.

13. The method as in claim 12 wherein the covering material is applied in a hot isostatic press process.

14. A method of manufacturing a collimating nozzle for a plasma arc torch comprising the steps of:

(a) machining a holder member from a copper block, said holder member comprising a tubular portion having first and second ends and with a lumen extending therebetween;

(b) machining an insert member from a copper block, said insert member having a tubular portion with first and second ends and a lumen extending therebetween, the tubular portion having an outer diameter that is less than a diameter of said lumen of the holder member and a generally circular flange having a face extending radially proximate said first end, the flange ending in a peripheral edge offset from said face;

(c) inserting the tubular portion of the insert member within the lumen of the holder member;

(d) welding the perpendicular edge of the insert member to the holder member at a location offset of said face and between the first and second ends of the holder member; and (e) cladding the face and a predetermined portion of said lumen of the insert member with a layer of material exhibiting a greater corrosion resistance than copper and of a predetermined thickness precluding penetration of the cladding layer by secondary arcing through to the copper.

15. The method as in claim 14 wherein the covering material is applied in one of a flame spraying process, a plasma spraying process and a hot isostatic press process.

16. A method of manufacturing a collimator nozzle for a plasma arc torch comprising the steps of:

(a) providing a first copper billet;

(b) cladding a predetermined surface of the first copper billet with a corrosion resistant metallic material to a desired thickness sufficient to resist secondary arc penetration at intended operating power levels in excess of 500 KW;

(c) providing a second copper billet;

(d) cladding a predetermined surface of the second copper billet with said corrosion resistant metallic material to a desired thickness;

(e) machining the first copper billet to form a holder member, the holder member including a generally cylindrical outer wall and a central bore of a first predetermined diameter passing longitudinally through the first copper billet, a counterbore of a second predetermined diameter extending through the cladding on the predetermined surface of the first copper billet and a plurality of radial bores oriented oblique to a longitudinal axis of the first copper billet, said radial bores extending from the outer wall to the central bore;

(f) machining the second copper billet to form an insert member, the insert member including a tubular stem of generally circular cross-section and first and second ends with a lumen extending therebetween, the outer diameter of the stem being less than a diameter of the central bore of the first copper billet and a radially extending flange at said first end surrounding the lumen where the flange has a diameter generally equal to the second predetermined diameter of the counterbore of the holder member;

(g) inserting the insert member into the counterbore of the holder member with the flange disposed in the counterbore; and (h) forming a continuous weld along a joint between a periphery of the flange and the wall in the holder member defining the counterbore.

17. The method as in claim 16 wherein the cladding steps comprise:

(a) placing plates of the corrosion resistant metallic material on the first and second copper billets; and (b) fusion bonding the plates to the billets using a hot isostatic pressing process.

18. The method as in claim 16 wherein the cladding comprises one of a nickel alloy and a chromium alloy.

19. The method as in claim 16 wherein the cladding step includes depositing said corrosion resistant metallic material to said predetermined thickness in a plasma transferred arc process.

20. A method of manufacturing a collimator nozzle for a plasma arc torch, comprising the steps of:

(a) providing a first copper billet;

(b) providing a second copper billet;

(c) cladding a predetermined surface of the second copper billet with said corrosion resistant metallic material to a desired thickness;

(d) machining the first copper billet for forming a holder member, the holder member comprising a tubular portion having first and second ends with a lumen extending therebetween;

(e) machining the second copper billet and cladding to form an insert member, the insert member having a tubular portion with first and second ends and a lumen extending therebetween, the tubular portion having an outer diameter that is less than a diameter of the lumen of the holder member and a generally circular flange having a face including the predetermined surface extending radially proximate the first end of the tubular portion of the insert member, the flange ending in a peripheral edge offset from said predetermined surface;

(f) inserting the tubular portion of the insert member within the lumen of the holder member; and (g) welding the peripheral edge on the flange to the holder member at a location offset of said face and between the first and second ends of the holder member.

21. The method as in claim 20 wherein the cladding steps comprise:

(a) placing plates of the corrosion resistant metallic material on the first and second copper billet; and (b) fusion bonding the plates to the first and second billets using hot isostatic pressing.

22. The method as in claim 20 wherein the cladding comprises one of a nickel alloy and a chromium alloy.

23. The method as in claim 20 wherein the cladding step includes depositing said corrosion resistant metallic material to said predetermined thickness in a plasma transferred arc process.

* * * * *